US009193317B2

(12) United States Patent
Seitz et al.

(10) Patent No.: US 9,193,317 B2
(45) Date of Patent: Nov. 24, 2015

(54) APPARATUS AND METHOD FOR GROUNDING AN ELECTROSTATIC DEVICE ATTACHED TO AGRICULTURAL SPRAY EQUIPMENT

(75) Inventors: David M. Seitz, Riga, MI (US); Rodney Allen Nichols, Orland, IN (US); Mark Etzler, Angola, IN (US); Steven Paul Norton, Coldwater, MI (US)

(73) Assignee: Carlisle Fluid Technologies, Inc., Charlotte, NC (US)

( * ) Notice: Subject to any disclaimer, the term of this patent is extended or adjusted under 35 U.S.C. 154(b) by 458 days.

(21) Appl. No.: 13/291,365

(22) Filed: Nov. 8, 2011

(65) Prior Publication Data
US 2012/0127623 A1 May 24, 2012

Related U.S. Application Data (60) Provisional application No. 61/416,613, filed on Nov. 23, 2010.

(51) Int. Cl.
*H05F 3/02* (2006.01)
*B60R 16/06* (2006.01)
*B05B 5/00* (2006.01)

(52) U.S. Cl.
CPC . *B60R 16/06* (2013.01); *B05B 5/00* (2013.01); *H05F 3/02* (2013.01)

(58) Field of Classification Search
USPC .......... 361/217, 216, 227, 219; 172/668, 677; 37/407; 239/690
See application file for complete search history.

(56) References Cited

U.S. PATENT DOCUMENTS

| | | | | | |
|---|---|---|---|---|---|
| 1,974,833 | A | * | 9/1934 | Reyhurn | 152/217 |
| 2,280,327 | A | * | 4/1942 | Curtis | 361/219 |
| 2,728,032 | A | * | 12/1955 | Foltz | 361/222 |
| 3,035,108 | A | * | 5/1962 | Kaehni | 123/637 |
| 3,461,973 | A | * | 8/1969 | Geurts | 172/264 |
| 4,000,443 | A | * | 12/1976 | Lever | 361/228 |
| 4,243,989 | A | * | 1/1981 | Piper | 343/715 |
| 4,402,560 | A | * | 9/1983 | Swainbank | 439/37 |
| 4,745,520 | A | * | 5/1988 | Hughey | 361/228 |
| 4,820,957 | A | * | 4/1989 | Zivkovich | 315/209 T |
| 6,003,794 | A | * | 12/1999 | Hartman et al. | 239/695 |
| 6,116,519 | A | * | 9/2000 | Williamson | 239/168 |
| 7,170,735 | B2 | * | 1/2007 | Diskin | 361/220 |
| 7,541,749 | B2 | * | 6/2009 | Ushijima | 315/291 |

* cited by examiner

*Primary Examiner* — Zee V Kitov
(74) *Attorney, Agent, or Firm* — Fletcher Yoder P.C.

(57) ABSTRACT

Various embodiments of the present disclosure provide a grounding apparatus for use with a spray device associated with a vehicle. The grounding apparatus is biased toward the ground so that a portion of the grounding apparatus makes contact with the ground even in uneven terrain. The grounding apparatus is configured to be mounted in a receiver portion of a trailer hitch. In addition, provided herein is a system for powering a spray device with a DC power source, such as an automotive battery. The system includes an oscillator coupled to a step up transformer.

13 Claims, 6 Drawing Sheets

APPARATUS AND METHOD FOR GROUNDING AN ELECTROSTATIC DEVICE ATTACHED TO AGRICULTURAL SPRAY EQUIPMENT

CROSS REFERENCE TO RELATED APPLICATION

This application claims priority to and benefit of U.S. Provisional Patent Application No. 61/416,613, entitled "APPARATUS AND METHOD FOR GROUNDING AN ELECTROSTATIC DEVICE ATTACHED TO AGRICULTURAL SPRAY EQUIPMENT," filed on Nov. 23, 2010, which is herein incorporated by reference in its entirety.

FIELD OF THE INVENTION

The invention relates generally to spray devices, and, more particularly, to spray devices used in agricultural settings.

BACKGROUND

This section is intended to introduce the reader to various aspects of art that may be related to various aspects of the present system and techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

It is known to use spray devices to apply a spray to a wide variety of target objects. Recently, the agriculture industry has used electrostatic spray devices for application of herbicides and pesticides to crops for controlling weeds and insects. The use of electrostatic spray devices in agricultural settings presents challenges related to the desired mobility and portability of these devices. For example, the target spray area for a field or orchard may be large, requiring that the spray device be moved repeatedly to spray the crops. In such arrangements, providing a power supply for the spray device that is portable and efficient may be challenging.

For spray devices that are used in conjunction with motorized vehicles or other transport mechanisms (e.g., carts or trailers), the spray devices are separated from the ground by rubber tires. This may allow the spray device itself or neighboring structures to hold a charge, which in turn may harm the electrical system of the spray device when a discharge occurs. In certain instances, the spray device may be grounded by dragging a large and heavy metal chain behind the equipment. However, such chains may not provide a constant connection with the ground if the vehicle moves over uneven terrain or if the chain becomes tangled.

SUMMARY

Various embodiments of the present disclosure relate to a grounding apparatus and method for a portable spray device that is mounted on a vehicle. The grounding apparatus provides a path to ground for any charge accumulated by the spray device and includes a grounding element that is biased (e.g., via a spring force) towards the ground, such that grounding element is less likely to lose contact upon experiencing external forces. The grounding apparatus may include a mounting element that may be configured to be coupled directly to a trailer hitch on a vehicle to facilitate installation. The grounding apparatus of the present disclosure provides advantages over structures that merely hang from the vehicle, such as metal chains, because these structures may become tangled and lose contact with the ground.

Other embodiments of the present disclosure relate to a power supply system for a spray device which is configured to be directly coupled to an automotive battery. While spray devices typically use alternating current, many portable power sources provide direct current. As provided herein, a power supply for a spray device may include a direct current power source coupled to a step-up transformer. In order to provide alternating current to the step-up transformer, the direct current power source may be used to power a tunable oscillator.

A spray device consistent with the present embodiments may be used in a variety of applications. As noted, the present embodiments may be used in agricultural settings. However, the present embodiments may be useful for other applications in which a spray device is mounted to a vehicle or other motorized transport, including industrial, manufacturing, or construction settings. Further, the spray device may be used to apply agricultural sprays, such as herbicides or pesticides, or any suitable spray, including metal or enamel sprays, water based and solvent (organic) based coating materials ranging from very low to high viscosity, or water and/or solvent based contact cements and adhesives, to name only a few.

These and other features, aspects, and advantages of the present disclosure will become better understood when the following detailed description is read with reference to the accompanying drawings in which like characters represent like parts throughout the drawings.

DETAILED DESCRIPTION

Figure 1:
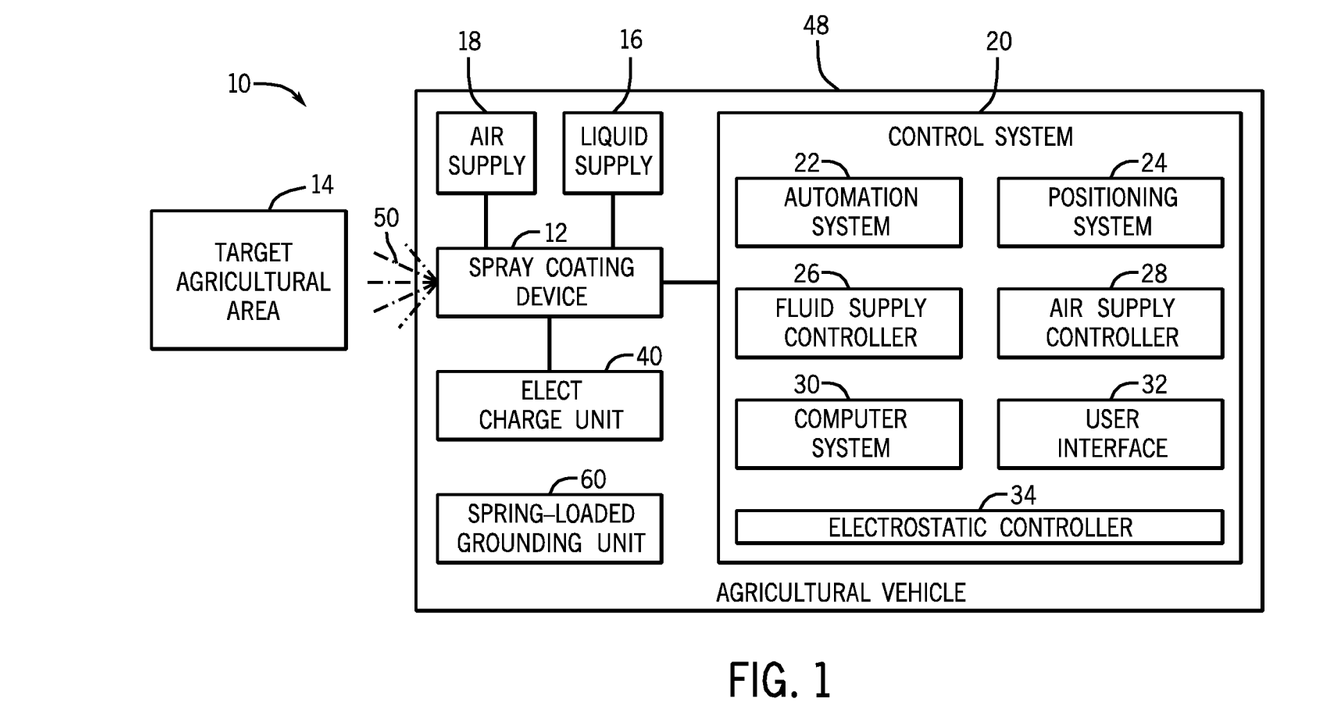
FIG. 1 is a block diagram illustrating exemplary agricultural spray system in accordance with an embodiment of the present disclosure.

Referring now to FIG. 1 an exemplary spray system 10 according to an embodiment of the present disclosure is shown. In the illustrated example, the spray system 10 comprises an electrostatic spray device 12 that may be coupled to a variety of supply and control systems, such as a liquid supply 16, an air supply 18, and a control system 20. The control system 20 facilitates control of the liquid and air supplies 16 and 18 and ensures that the spray coating gun 12 provides an acceptable quality spray coating on the target 
object 14. For example, the control system 20 may include an automation system 22, a positioning system 24, a liquid supply controller 26, an air supply controller 28, a computer system 30, and a user interface 32. The spray system 10 may also include an electrical charging unit 40 (e.g., a power supply). The positioning system 24 may facilitates movement of the spray device 12 relative to the target agricultural area 14 to target the direction of the electrostatic spray 50. In embodiments in which the system is coupled to a vehicle 48, the spray system 10 may also include a spring-loaded grounding apparatus 60. The spray system 10 may provide a computer-controlled mixture of coating liquid, liquid and air flow rates, and spray pattern.

The spray system 10 of FIG. 1 is applicable to a wide variety of applications, liquids, target objects, and types/configurations of the spray device 12. For example, a user may select a desired liquid from a plurality of different spray liquids, which may include agricultural liquids such as pesticides, biocides, fungicides, nutrients, growth materials, or fertilizing materials. The user also may select a desired object from a variety of different objects, such as different material and product types. In particular embodiments, the object may be an agricultural object, including a tree, bush, vine, or other crop-producing plant. The spray device 12 also may comprise a variety of different components and spray formation mechanisms to accommodate the target object 14 and liquid supply 16 selected by the user. For example, the spray device 12 may comprise an air atomizer, a rotary atomizer, an electrostatic atomizer, or any other suitable spray formation mechanism.

Figure 2:
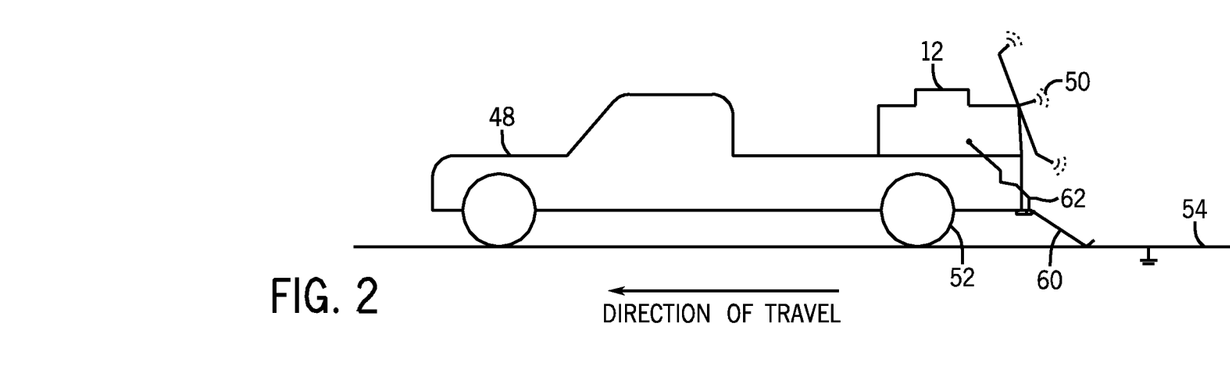
FIG. 2 is a side view of a grounding assembly that may be used with the spray system of FIG. 1 and a vehicle, illustrating movement in a forward direction.
Figure 3:
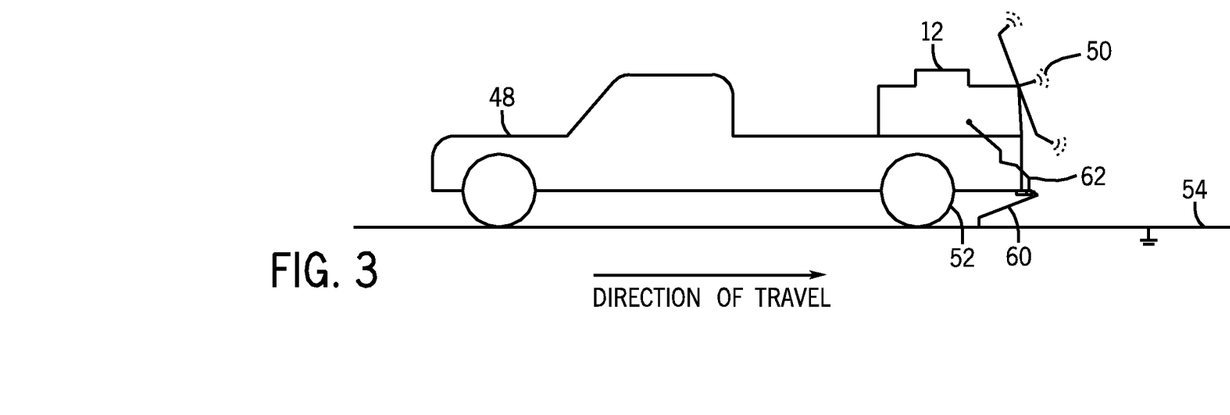
FIG. 3 is a side view of a grounding assembly that may be used with the spray system of FIG. 1, illustrating a grounding apparatus movement in a backward direction.
Figure 4:
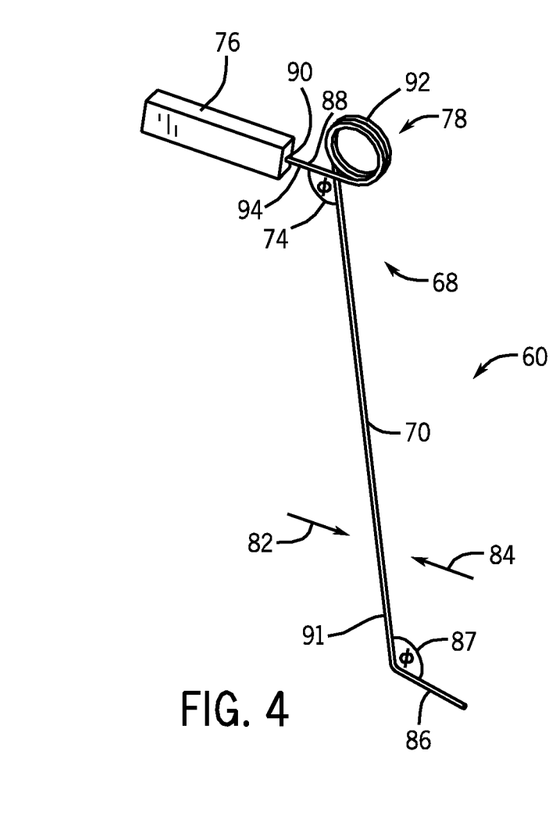
FIG. 4 is a perspective view of an exemplary grounding assembly.

Referring now to FIG. 2, an example grounding assembly 60 for use in conjunction with the spray system of FIG. 1 is shown. As illustrated, the spray system 10 may be supported by a vehicle 48. The vehicle 48 may be any appropriate vehicle, e.g., motorized or non-motorized vehicle. Further, the spray system 10 may be mounted or otherwise associated with the vehicle 48 such that the spray system 10 may be moved about an agricultural setting to apply an electrostatically charged spray 50 of the liquid over a relatively large area. The vehicle 48 includes tires 52 that separate the system 10 from the ground 54. Grounding assembly 60 couples to the spray device 12 via a coupling 62 (e.g. a wire or other conductive coupling) that allows any charge in the spray device 12 to discharge to ground 54.

The grounding assembly 60 is configured such that contact with the ground 54 is maintained whether the vehicle 48 moves in a forward direction or backward direction (as illustrated in FIG. 3). For example, the grounding assembly 60 may be configured such that a biasing force biases at least a portion of the grounding assembly 60 to remain in contact with the ground 54.

Referring now to FIG. 4, in one embodiment, the grounding assembly 60 includes a spring portion 68 and a mounting portion 76. The spring portion 68 includes a biased member 70 that is capable of rotating (e.g., partially pivoting), such that an angle 74 between the biased member 70 and the mounting portion 76 is increased or decreased when force is applied from motion of the vehicle 48. In the illustrated embodiment, a torsion spring 78 provides the biasing force. However, in other embodiments, the biasing force may be provided by other types of springs or biasing structures. In particular, when the grounding assembly 60 is in operation, the biased member 70 holds an extending portion 86 against the ground 54 so that grounding contact is maintained. The extending portion 86 extends at an angle 87 from the biased member 70, so that the extending portion 86 is generally parallel with the ground 54. During operation, when the vehicle 48 is in motion, force may be transmitted from the ground 54 to extending portion 86. However, because the ground 54 can be uneven, rotation of the biased member 70, which in turn changes the angle 84 of biased member 70 relative to the ground 54, helps maintain contact with the ground 54.

In one embodiment, the spring force may be provided by biased member 70. That is, the spring force is provided by the material from which the biased member is formed and the angle 84 at which the biased member 70 extends from the mounting portion 76. In certain embodiments, the ground apparatus 60 may not include a spring portion 68, and instead may rely on the spring force of the resilient biased member 70. In other embodiments, the angle 84 may be, e.g., 10 to 80, 20 to 70, 30 to 60, or 40 to 50 degrees. In addition, the angle 84 may be less than approximately 30, 40, 50, 60, 70, or 80 degrees.

In the illustrated embodiment, the torsion spring 78 includes a first end 91. Extending away from a coil 92 to the biased member 70, and a second end 94 extending away from the coil 92 to the base coupling portion at an and the angle 74 relative to the biased member 70. The base coupling portion 88 is coupled to the mounting portion 76 by any suitable technique. For example, the mounting portion 76 may include an integral bore 90 that is sized such that part of the base coupling portion 88 may be inserted into the bore 90 and heat bonded to the mounting portion 76. Other suitable attachment techniques include brazing, adhesion, compression fitting, and screwing via complementary threads on the mounting portion 76 and the base coupling portion 88. In particular, the attachment of the mounting portion 76 to the base coupling portion 88 maintains the electrical conductivity between these two elements. The spring portion 68, including base coupling portion 88, the torsion spring 78, the biased member 70, and the extending portion 86, may be formed from a single wire or metal material that is bent into the torsion spring 78, leaving the first end 91 and the second end 94 sufficiently sized and shaped to form the biased member 70 and extending portion 86 as well as the base coupling portion 88. As noted, the grounding assembly 60, including the mounting portion 76 and the spring portion 68, is electrically conductive, allowing discharge to the ground 54. As such, the wire from which the spring portion 68 is formed and the mounting portion 76 may be zinc, copper, or steel (e.g., galvanized steel). In addition, in some embodiments, certain portions of the grounding assembly 60 may be partially coated or covered with an insulating material, so long as the grounding apparatus 60 is able to discharge to the ground 54. In particular, any coupling to the vehicle 48 and the ground 54 (i.e., via extending portion 86) is generally be uninsulated.

The strength of the biasing force of the torsion spring 78 is related to certain properties of the torsion spring 78. The stiffness of the torsion spring 78 is a function of the elastic modulus of material from which the spring is formed, the diameter of the material (e.g., metal piece or wire), the mean diameter of the spring 78, the length of the spring 78, and the number of loops in the coil 92. It should be understood that any of these parameters may be selected to achieve a desired spring force. Further, the torsion spring 78 may be a coiled spring or a flat spring. The spring force and geometry (including angle 74) may be selected to avoid substantially impeding the motion of the vehicle 48 or passing a spring deformation point when in contact with the ground. In addition, the biasing force may be sufficiently low so that an operator may easily and safely remove the grounding assembly 60 when the torsion spring 78 is loaded. The stiffness of the torsion spring 78 may, in certain embodiments, be less than approximately 75 lbs/inch, or approximately 10 lbs/inch to 50 lbs/inch or approximately 25 lbs/inch to 75 lbs/inch. For example, in one particular embodiment, the spring force is approximately 40 lbs.

Figure 5:
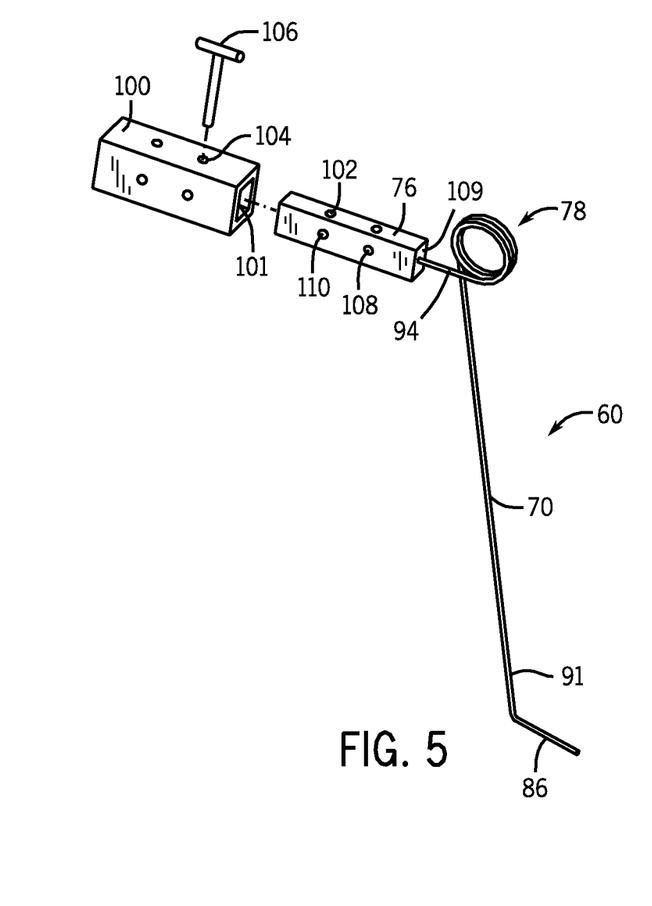
FIG. 5 is a partial perspective view of an exemplary grounding assembly inserted into a receiver of a trailer hitch.

FIG. 5 is a perspective view of a mounting portion 76 of a grounding assembly 60 coupled to a trailer hitch receiver 100 (e.g., a Reese hitch receiver) in accordance with certain embodiments of the present disclosure. As illustrated in FIG. 5, the mounting portion 76 is sized and shaped to complement (and be inserted into) the receiver 100. By providing a mounting portion 76 that is configured to be used in conjunction with a Reese hitch receiver 100 (or any other type of receiver), the grounding apparatus 60 may be coupled to existing components on a vehicle (e.g., vehicle 48). As shown, the receiver 100 has an opening 101 that is substantially square (e.g., a 2 or 2.5 inch square). However, the opening 101 may be any suitable shape. Further, the mounting portion 76 may have, in cross-section, a slightly smaller complementary shape relative to the opening 101.

To facilitate the coupling, the mounting portion 76 may have one or more bores 102 that are positioned along the mounting portion 76 to align with corresponding bores 104 in the trailer hitch receiver 100. A pin 106 or other attachment device (e.g., a screw, wire, or cable) may be inserted through aligned bores 102 and 104 to couple the grounding apparatus 60 to the trailer hitch receiver 100. The mounting portion 76 may also have a protrusion 108 for attachment to the equipment coupling 62. The protrusion 108 is positioned towards a distal end region 109 (e.g., the spring portion coupling end region), so that the protrusion 108 is not inserted into the receiver 100. For example, a wire coupling 62 may be wrapped around the protrusion 108. In other embodiments, the coupling 62 may be threaded into a bore (e.g., bore 102) or tied to or wrapped around the base coupling portion 88.

Figure 6:
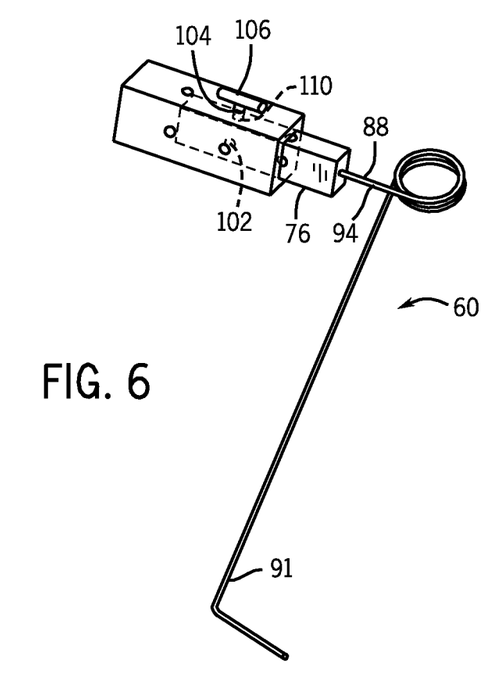
FIG. 6 is a partial perspective view of an exemplary grounding assembly inserted into a receiver of a trailer hitch in an disengaged position.

In one embodiment, the grounding apparatus may be inactivated by simply rotating the mounting portion 76 approximately 180°, so that the biased member 70 points upward rather than toward the ground 54. In addition, as shown in FIGS. 5 and 6, the mounting portion 76 may include bores 110 that are positioned on opposing faces of the mounting portion 76, so that the mounting portion 76 may be rotated 90° from the active position to an inactive position. In other embodiments, for example if the mounting portion 76 is a cylinder, the mounting portion 76 may be rotated e.g., 10 to 180, 30 to 90, or at least 45 degrees. After rotation, the pin 106 may be inserted into the bores 104 and 110 to secure the mounting portion 76 to the receiver 100.

Figure 7:
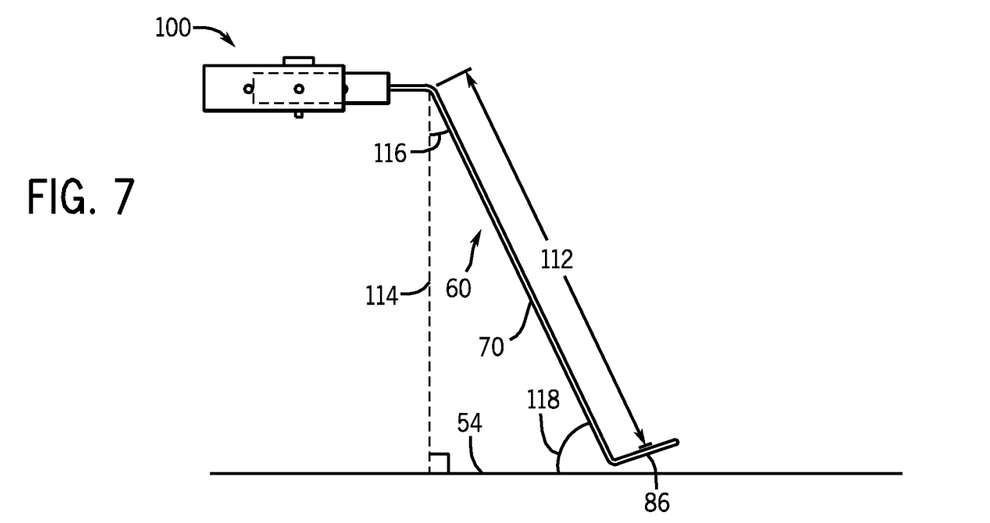
FIG. 7 is a side view of an exemplary grounding assembly inserted into a receiver of a trailer hitch.

The length 112 of the biased member 70 may be selected depending on the manner in which the grounding assembly 60 is coupled to the vehicle 48. For a hitch receiver-mounted grounding apparatus 60, the biased member 70 may be at least as long as the receiver-to-ground distance 114. It should be appreciated, however, that this may vary depending on the wheel size of the vehicle 48 and other factors. Because the biased member 70 is nonorthogonal to the ground 54 when in operation, the biased member 70 may be longer than the receiver-to-ground distance 114. As shown in FIG. 7, the biased member forms 70 the hypotenuse of a right triangle, with the ground 54 and an imaginary line 114 (e.g., orthogonal to the ground 54 representing the receiver-to-ground distance) forming the other sides of the triangle. For a hitch receiver-mounted grounding apparatus 60, the length of line 114 may be determined based on the position of the hitch receiver 100. Accordingly, various appropriate lengths 112 of the biased member 70 may be selected based on respective lengths of line 114 (e.g., the receiver-to-ground drop) and a desired angle 116 and/or 118.

Figure 8:
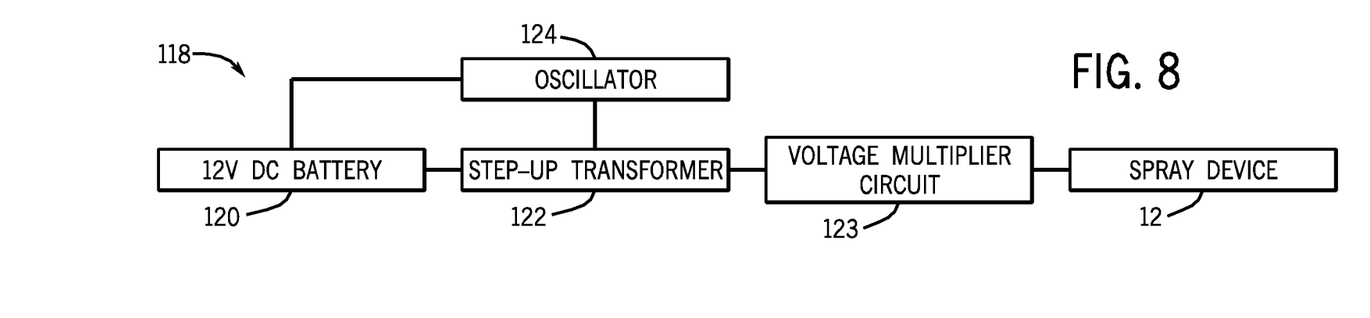
FIG. 8 is a block diagram of an exemplary high voltage cascade for use with the system of FIG. 1.

The spray device 12 may be mounted or carried on a vehicle (e.g., vehicle 48) for transporting and operating the spray device 12 over a wide area. In such embodiments, it may be advantageous for the spray device 12 to be coupled to a portable power source. As shown in FIG. 8, a system 118 for the spray device 12 may include an automotive battery power source, such as a 12V DC battery 120. The battery 120 powers an oscillator 124, which is used to alternate power to the step up transformer 122, thus creating an alternating current across the step up transformer 122. The step up transformer 122 is provided to convert low AC voltage to higher AC voltage. The output of the step up transformer 122 powers the voltage multiplier circuit 123, which converts the AC voltage to a higher DC voltage and powers the spray device 12. The depicted arrangement draws less power than a DC to AC inverter-based system and may be more cost-effective.

Figure 9:
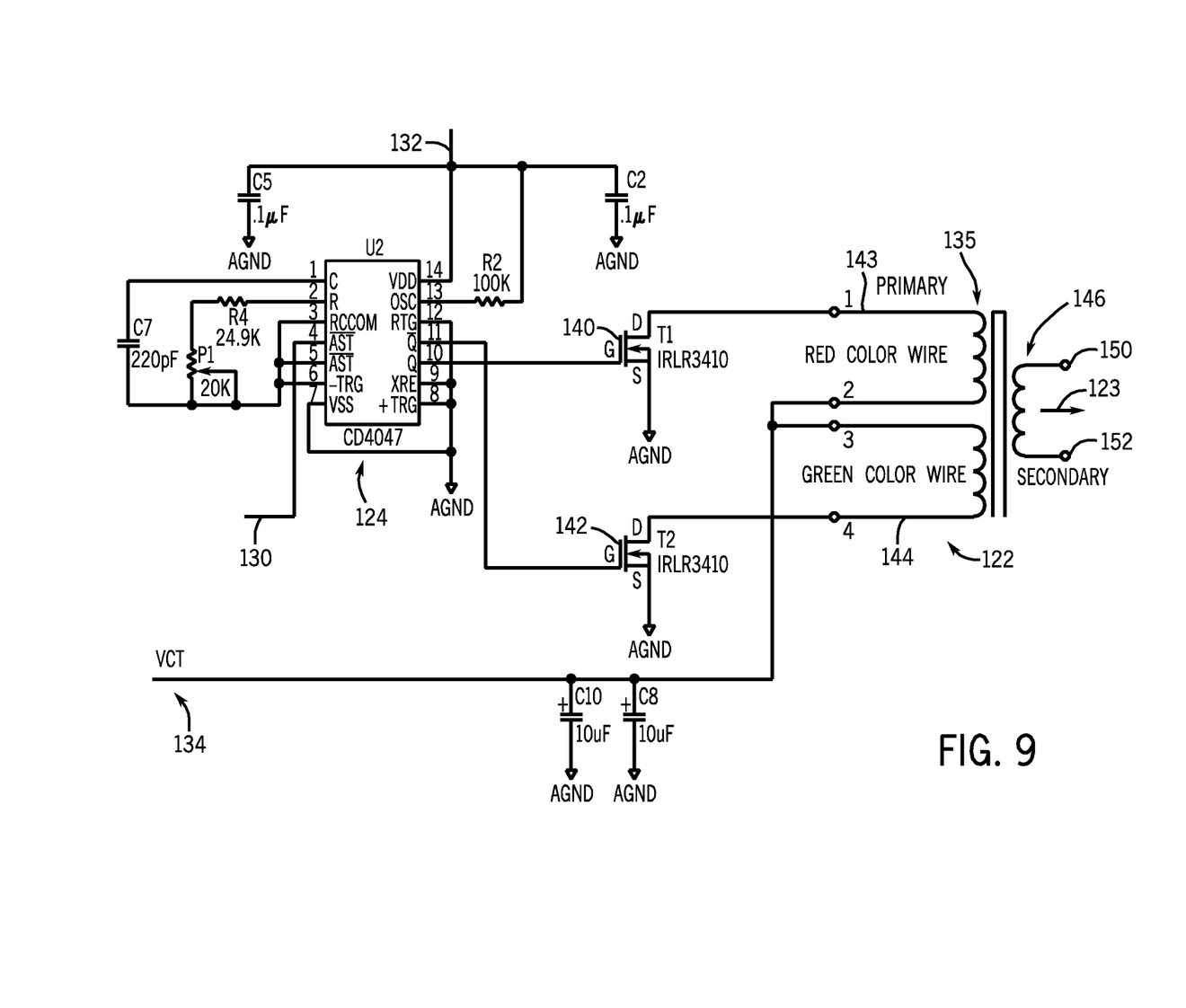
FIG. 9 is a circuit diagram of the high voltage cascade of FIG. 8.

In particular, as shown in the circuit diagram in FIG. 9, the battery (e.g., battery 120) supplies voltage to the center tap 134 of the primary winding 135 of the step up transformer 122. The battery 120 also supplies voltage at inputs 130 and 132 of the oscillator 124. This in turn powers the oscillator 124, which has an adjustable frequency, to alternately turn on and off electronic switching devices 140 and 142, which are coupled to a first end 143 and a second end 144 of the primary winding 135. This alternating of the switching devices 140 and 142 produces an AC signal across the primary winding 135. The use of an adjustable oscillator 124 allows the frequency to be adjusted via potentiometer P1 to a point where the current drawn from the center tap 134 is minimal, which improves battery life. To adjust the performance of the high voltage cascade, the input voltage can be down-regulated, e.g., electronically. The voltage across the primary winding 135 is stepped up via a secondary winding 146. The ratio of windings between the secondary winding 146 and the primary winding 135 dictates the voltage into the voltage multiplier circuit. In a particular embodiment, the 12V DC input from the battery 120 is converted to AC via the oscillator 124 and stepped up to at least approximately 3,000 VAC. The voltage multiplier circuit 123 may be powered via coupling to leads 150 and 152 of the secondary winding 146. The spray device 12 may be powered via coupling to the voltage multiplier circuit 123.

While the present invention has been described in connection with what is presently considered to be the most practical and preferred embodiments, it is to be understood that the invention is not limited to the disclosed embodiments, but on the contrary is intended to cover various modifications and equivalent arrangements included within the spirit and scope of the claims. It is thus to be understood that modifications and variations in the present invention may be made without departing from the novel aspects of this invention as defined in the claims, and that this application is to be limited only by the scope of the claims.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A vehicle grounding system for a vehicle mounted spray system, the vehicle grounding system comprising:
    a coupling portion configured to electrically couple to the vehicle mounted spray system;

a vehicle mounting portion directly and electrically coupled to the coupling portion, wherein the vehicle mounting portion is configured to mount in an active position or an inactive position; and a grounding extension portion directly and electrically coupled to the vehicle mounting portion;

wherein when the vehicle mounting portion is mounted in the active position, the grounding extension portion is biased toward a path of a vehicle during vehicle motion such that at least part of the grounding extension portion is configured to be in contact with the ground during vehicle motion and the vehicle grounding system is configured to discharge a static charge in the vehicle mounted spray system; and wherein when the vehicle mounting portion is mounted in the inactive position, the grounding extension portion is biased away from the path.

2. The vehicle grounding system of claim 1, wherein the vehicle mounting portion comprises a vehicle hitch mount.

3. The vehicle grounding system of claim 1, wherein the grounding extension portion comprises an elongated resilient member, and a spring force of the elongated resilient member at least partially contributes to the bias toward the path of the vehicle.

4. The vehicle grounding system of claim 1, further comprising a spring coupled to the grounding extension portion, wherein a spring force of the spring at least partially contributes to the bias of the grounding extension portion toward the path of the vehicle.

5. The vehicle grounding system of claim 4, wherein the spring comprises a torsion spring.

6. The vehicle grounding system of claim 4, wherein the grounding extension portion comprises a one-piece structure having the spring and an elongated member configured to contact the path.

7. The vehicle grounding system of claim 1, wherein the grounding extension portion is configured such that it extends at an angle relative to the path, and wherein the angle is less than approximately 60 degrees and is not fixed.

8. The vehicle grounding system of claim 1, wherein the grounding extension portion comprises an electrically insulated portion and an electrically exposed portion, wherein the electrically exposed portion is configured to face the path, and the electrically insulated portion is configured to be away from the path.

9. The vehicle grounding system of claim 1, wherein the vehicle mounting portion is configured to rotate at least 90 degrees between the active position and the inactive position.

10. A system, comprising:
an electrostatic spray device configured to mount to a vehicle; and
a grounding system configured to ground the electrostatic spray device to a ground supporting the vehicle, the grounding system comprising:
a coupling portion directly and electrically coupled to the grounding system to the electrostatic spray device;
a vehicle mounting portion directly and electrically coupled to the coupling portion and configured to mount in an active position or an inactive position; and
a grounding extension portion directly and electrically coupled to the vehicle mounting portion;
wherein the grounding system is configured such that when the vehicle mounting portion is in the active position, the grounding extension portion is biased toward the ground such that at least part of the grounding extension portion is configured to be in contact with the ground during vehicle motion, and when the vehicle mounting portion is in the inactive position, the grounding extension portion is biased away from the ground.

11. The system of claim 10, wherein the grounding extension portion comprises an elongated resilient member having a spring force to at least partially spring bias the grounding extension portion toward the ground, and the grounding extension portion is oriented at an acute angle relative to the ground.

12. The system of claim 10, comprising a power system coupled to the electrostatic spray device, wherein the power system comprises:
a step up transformer configured to receive a voltage from a direct current power source, wherein the direct current power source is directly coupled to a voltage center tap of the step up transformer; and
an oscillator configured to receive the voltage only from the direct current power source, wherein the direct current power source is directly coupled to at least one input of the oscillator;
wherein the oscillator is configured to alternate between a first switch coupled to a first end of a primary winding of the step up transformer and a second switch coupled to a second end of the primary winding of the step up transformer such that an alternating current is produced across the primary winding of the step up transformer when direct current is supplied to the oscillator.

13. The vehicle grounding system of claim 9, wherein the vehicle mounting portion is configured to rotate along an axis of rotation extending parallel to the ground.

* * * * *